US008132595B2

(12) United States Patent  
Gayaut

(10) Patent No.: US 8,132,595 B2
(45) Date of Patent: Mar. 13, 2012

(54) PUMP IRON RESTRAINT SYSTEM

(75) Inventor: Gilbert Anthony Gayaut, Corpus Christi, TX (US)

(73) Assignee: Nabors Well Services, Ltd., Houston, TX (US)

( * ) Notice: Subject to any disclaimer, the term of this patent is extended or adjusted under 35 U.S.C. 154(b) by 469 days.

(21) Appl. No.: 12/424,289

(22) Filed: Apr. 15, 2009

(65) Prior Publication Data
US 2010/0263760 A1  Oct. 21, 2010

(51) Int. Cl.
*F16L 3/00* (2006.01)
(52) U.S. Cl. ........... 138/107; 138/106; 248/49; 285/117
(58) Field of Classification Search .................. 138/106, 138/107; 24/335
See application file for complete search history.

(56) References Cited

U.S. PATENT DOCUMENTS

| | | | | |
|---|---|---|---|---|
| 1,864,816 A | * | 6/1932 | Hamer | 285/117 |
| 3,813,733 A | * | 6/1974 | Flohr | 285/117 |
| 4,333,675 A | * | 6/1982 | Wirkkala | 294/82.1 |
| 4,989,903 A | * | 2/1991 | McAllister | 285/114 |
| 5,507,533 A | * | 4/1996 | Mumma | 285/114 |
| 5,689,862 A | * | 11/1997 | Hayes et al. | 24/284 |
| 5,873,608 A | * | 2/1999 | Tharp et al. | 285/114 |
| 6,481,457 B2 | | 11/2002 | Hayes et al. | 137/377 |
| 2008/0252042 A1 | * | 10/2008 | Sparkes et al. | 280/491.3 |

* cited by examiner

*Primary Examiner* — Patrick F Brinson
(74) *Attorney, Agent, or Firm* — Vinson & Elkins L.L.P.

(57) ABSTRACT

A pump iron restraint system is disclosed in which a fastening system is coupled to successive pump iron joints and a wireline is threaded through the fastening system. The fastening system may comprise a pair of endless flat straps, each of which is coupled to one of the pump iron joints. The eyes of the endless flat straps are placed around the interior arch of the screw pin shackle. A wireline is placed through the spaced formed by the screw pin and the screw pin shackle. The wireline is secured at the well site so that the wireline is taut.

21 Claims, 4 Drawing Sheets

US 8,132,595 B2

PUMP IRON RESTRAINT SYSTEM

TECHNICAL FIELD

The present disclosure relates generally to the field of oilfield services and oilfield well servicing, drilling, and, more particularly, to a pump iron restraint system.

BACKGROUND

During a well servicing or drilling operation, pump iron is used to transport gas and/or fluid from a mud pump to the well. The pump iron is typically laid along the ground between the mud pump and the well. The pump iron is typically not laid in a straight line between the mud pump and the well. In some cases, the pump iron will have to be routed around obstacles at the well site. The pump iron is composed of swing joints, hammer unions, and lengths of pump iron. If a pump iron system were to fail due to some combination of system fatigue or pressure, the failure could be catastrophic in nature. If a pump iron system were to fail, the lengths of pump iron could be thrown about the well site, damaging other items and equipment and, more importantly, potentially causing personal injury.

SUMMARY

In accordance with the present disclosure, a pump iron restraint system is disclosed in which a fastening system is coupled to successive joints of pump iron and a wireline is threaded through the fastening system and connected to suitable anchorages at each end. The fastening system for each joint of pump iron may comprise a pair endless flat straps, each of which is coupled by a choker hitch to one of the joints of pump iron One end of each of the endless flat straps is inserted into a shackle. A wireline is placed through the space formed by the pin and the shackle and a screw pin is inserted to close the eye of the shackle to prevent the endless flat straps from being removed. The wireline is secured to fixed objects at the well site so that the wireline is taut. A snatch block that is coupled to a shackle may also be used to achieve tension in the wireline. The use of the pump iron restraint system restrains the pump iron in the event of a failure of the pump iron system, thereby providing a safe area for employees to work. If a joint of pump iron fails, the pump iron restraint system holds the failed joint in place and prevents the force of the expelled gas and/or fluid from causing the remainder of the line to flail and injure persons or property.

One technical advantage of the present disclosure is the provision of a pump iron restraint system that can be easily and quickly assembled with parts that are commonly found in rigging shops that provide services to the well servicing and drilling industry. The pump iron restraint system can be readily assembled from components that are typically found in a well servicing and drilling environment. As a result, components need not be specifically designed for use in the pump iron restraint system. Another technical advantage of the present disclosure is that the disclosed system is unobtrusive and does not add significant additional complexity to the existing pump iron system. Another technical advantage is that the pump iron restrain system has a small footprint and introduces relatively little in the way of additional parts into the surface area of the well site. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
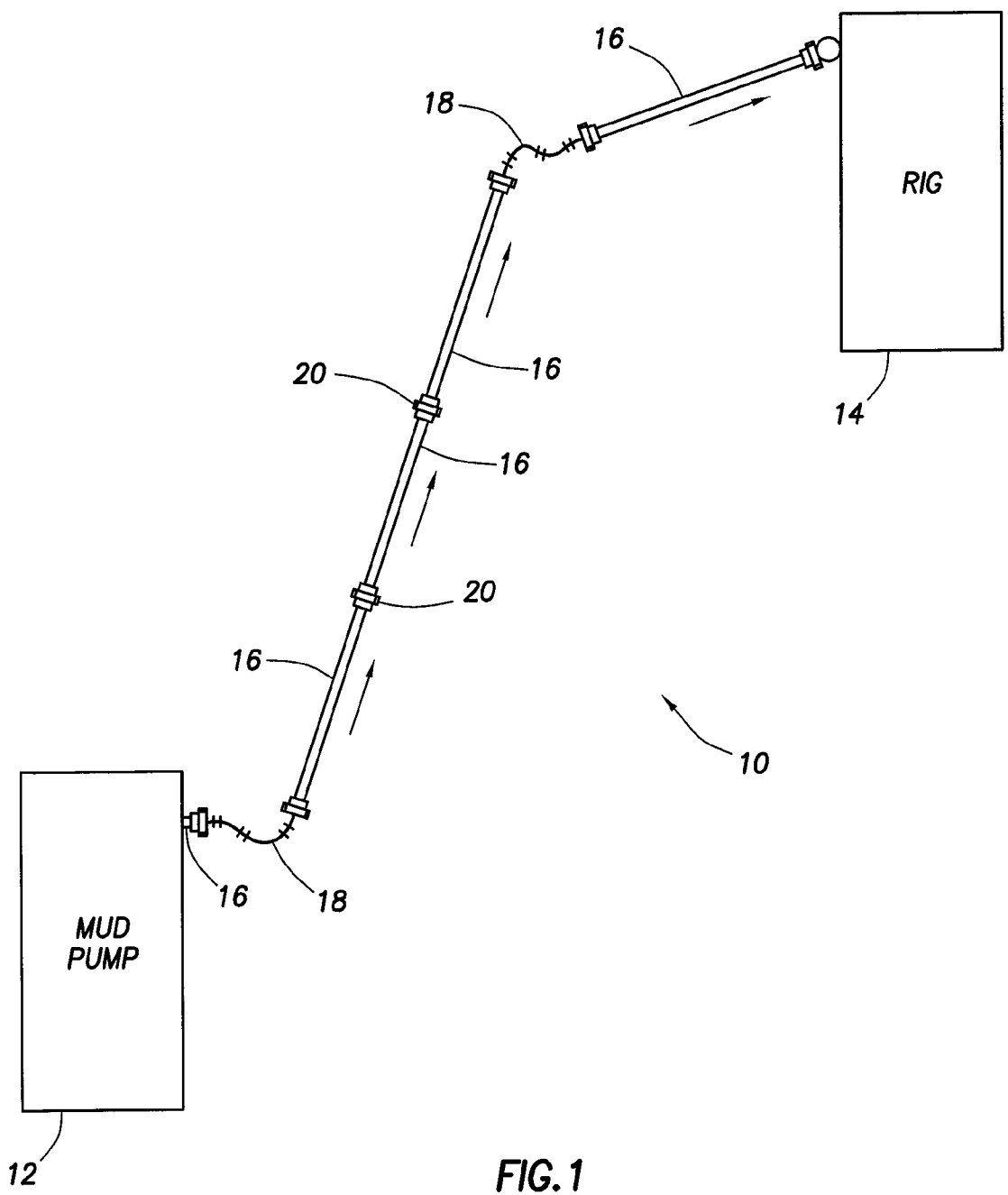
FIG. 1 is a diagram of a pump iron system.

FIG. 1 is a diagram of a pump iron system, which is indicated generally at 10. Pump iron system 10 includes joints of pump iron 16 that are placed between a pump 12 and a well servicing or drilling rig 14. Drilling mud and other fluids are pumped through the pump iron system between the pump and the well servicing or drilling rig. Joints 16 are connected end to end to one by hammer unions 20. In many well servicing and drilling environments, the area between the pump and the well servicing or drilling rig is not a straight line. Instead, it is often the case that the pump iron system 10 has to be routed around obstacles at the well site. In addition, pump iron system 10 may encounter elevation changes that cause the next following joint 16 of pump iron to be higher or lower than the preceding link. In these instances, it is possible to use a swivel joint 18 to route around obstacles or to create an elevation change between successive joints in the pump iron system.

Figure 2:
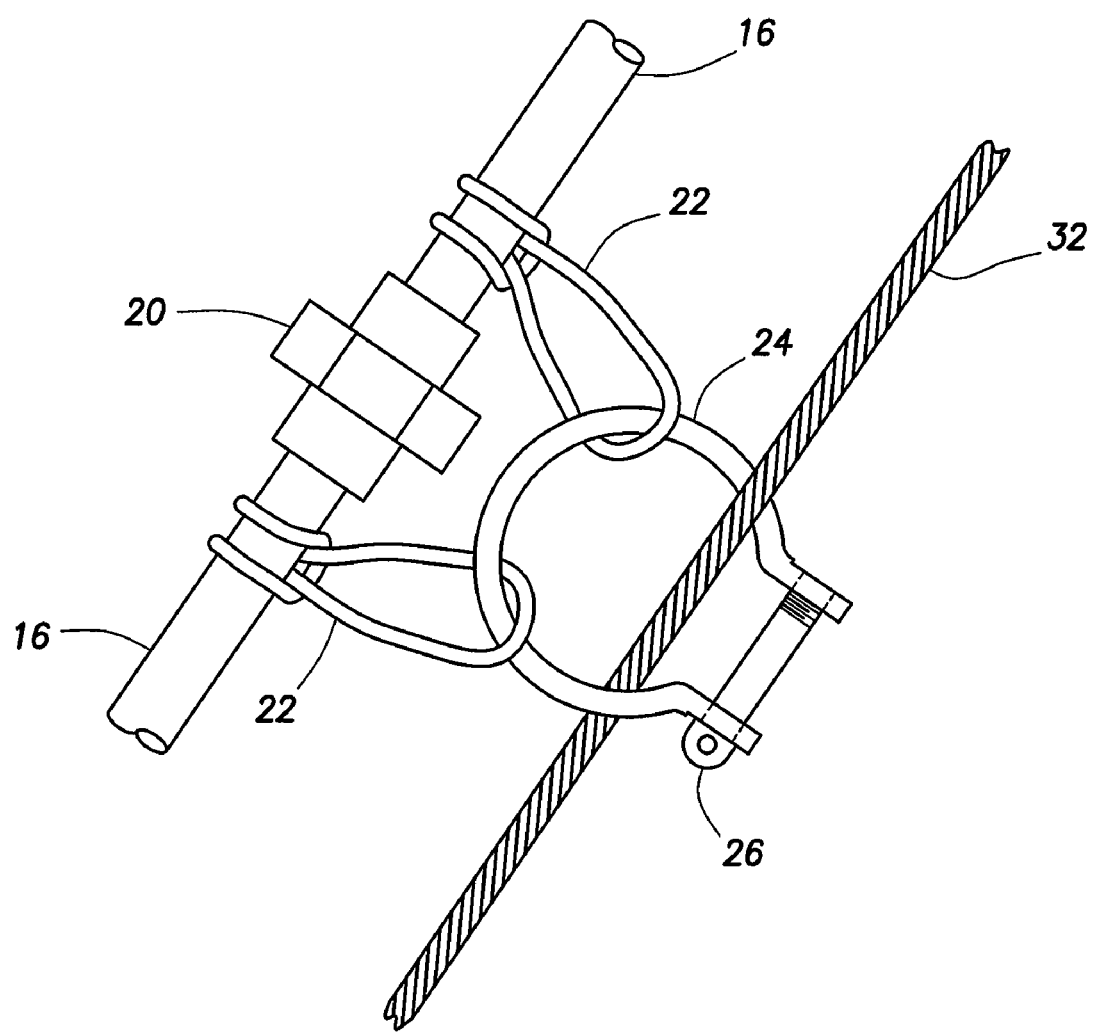
FIG. 2 is a pictorial view of consecutive pump iron joints secured with a fastening system of endless flat straps, shackle, and pin.
Figure 3:
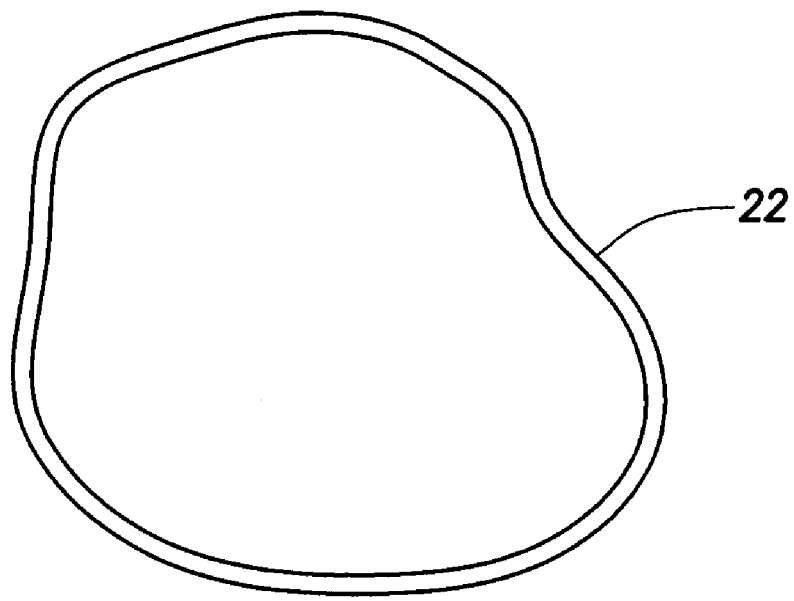
FIG. 3 is a pictorial view of an endless flat strap.
Figure 4:
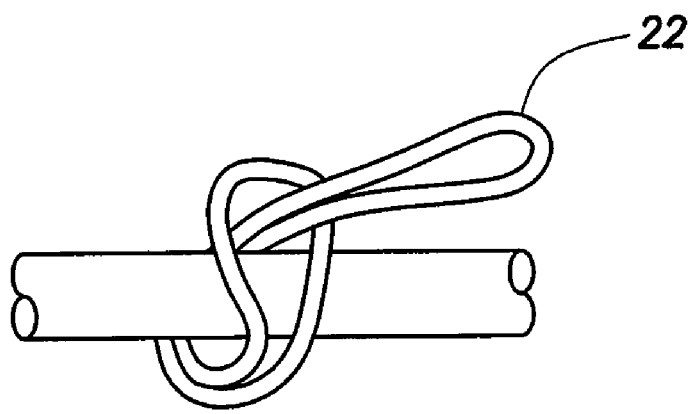
FIG. 4 is a pictorial view of an endless flat strap coupled to a joint through a choker hitch knot.

Shown in FIG. 2 is an example of the implementation of pump iron restraint system to secure consecutive joints in a pump iron system. Joints 16 of pump iron are connected to one another through a hammer union 20. An endless flat strap 22 is coupled to each of joint 16 on each side of the hammer union. Endless flat strap 22 is a strap that is flat and in the form of a loop. A pictorial view of an endless flat strap is shown in FIG. 3. Each endless flat strap is coupled to the joint 16 through a choker hitch knot. A diagram of a choker hitch knot is shown in FIG. 4. With reference to FIG. 2, the endless flat straps 22 are threaded around joints 16 in a choker hitch, thereby forming an eye in each endless flat strap 22. A screw pin shackle 24 is threaded through each eye, and a screw pin is threaded through the terminal ends of the screw pin shackle. A wireline 32 is threaded through the aperture formed by the screw pin shackle 24 and screw pin 26. The wireline 32 is placed along the length of the pump iron restraint system. The wireline 32 is placed roughly parallel to the links of pump iron and is anchored at the end points of the pump iron system. The running length of wireline 32 is inserted into the cavity of each screw pin shackle 24 and corresponding screw pin 26. With reference to FIG. 1, the wireline 32 could be anchored at the pump 12 and the well servicing or drilling rig 14. The wireline 32 is threaded along the length of the pump iron system through each instance of endless flat straps, screw pin shackles, and screw pins. The wireline is pulled tight at its endpoints so that the wireline is taut throughout its length.

Figure 5:
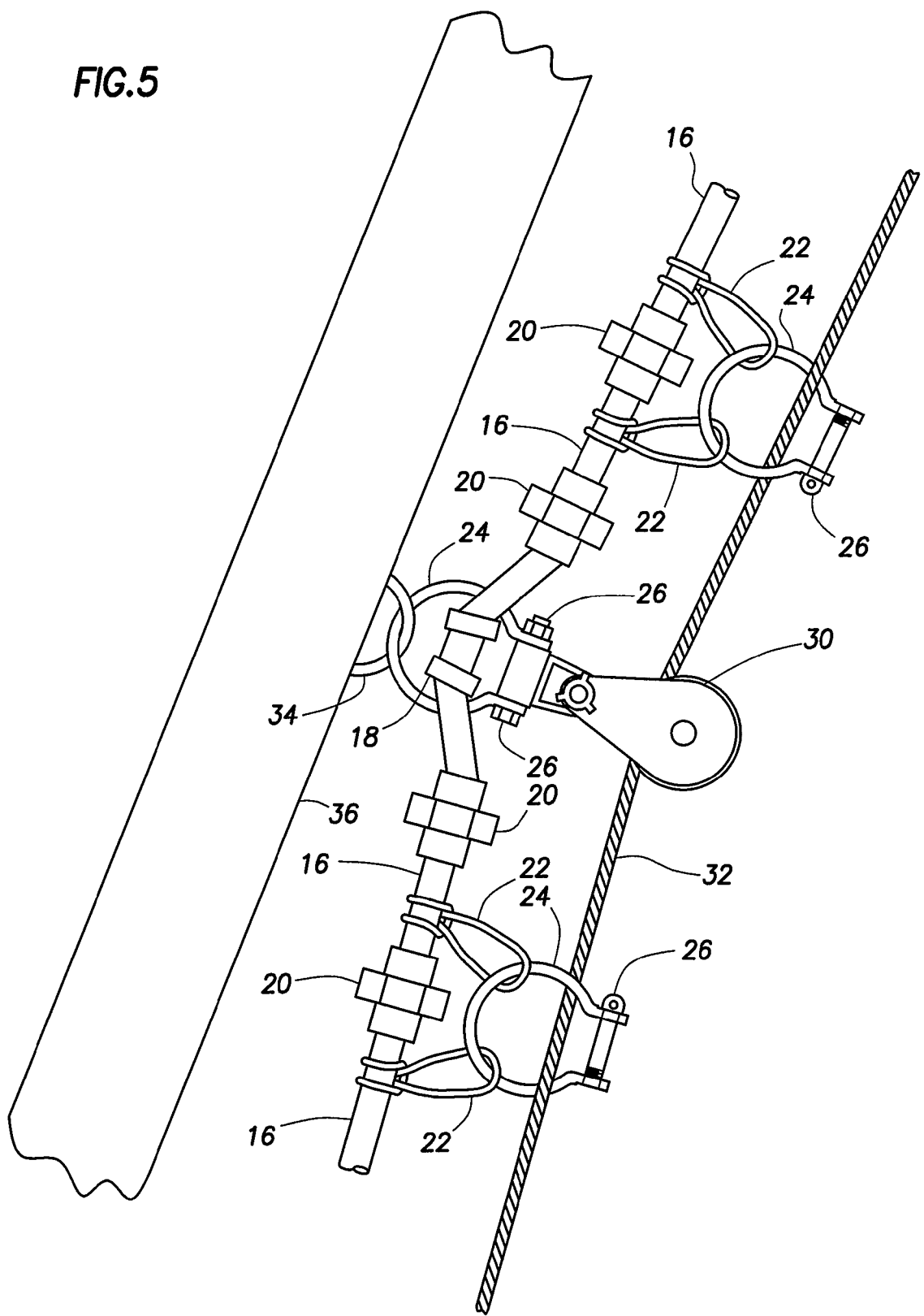
FIG. 5 is a pictorial view of consecutive joints of pump iron coupled to an anchorage.

An expansion and variation of the pump iron restraint system of FIG. 2 is shown in FIG. 5. FIG. 5 is a view of consecutive joints of pump iron coupled to a suitable anchorage 36. In the system of FIG. 5, a pair of shackles 24, with accompanying pins 26, are coupled to a set of flat straps 22, as shown in FIG. 2. Also included in FIG. 5 is a shackle 24 that is coupled to a snatch block 30 at a pin 26. The shackle 24 that is coupled to the snatch block is also coupled to a hook 34 that is itself anchored to a stationary object or anchorage 36. The coupling of the shackle 24 and snatch block 30 to the stationary object assists in anchoring the entire pump iron restraint system. Wireline 32 is threaded through snatch block 30. The threading of wireline 32 through the snatch block allows for the introduction of additional tension in the line, and the use of a snatch block is useful if the restraint system includes an angle between its endpoints. The snatch block is placed under the joints of pump iron, which assists in further anchoring the restraint system and the snatch block in place. The placement of the snatch block in the vicinity of a swivel joint 18 allows the restraint system to accommodate an angle between the endpoints of the system. The introduction of additional tension in wireline 32 through the snatch block provides for additional restraint in the system.

A fastening system comprising a set of endless flat straps, a screw pin shackle, a screw pin, and an optional snatch block may be placed at each joint along the length of the pump iron system at regular intervals. In addition, the fastening system of a set of endless flat straps, a screw shackle, a pin, and an optional snatch block may also be used with other connectors for coupling joints of pump iron. Another suitable connector is a swing joint. When the fastening system is used with a swing joint, the configuration is the same as that shown in FIG. 4, with the exception that a swing joint is used in place of a hammer union when there is a directional change in the pipe. An endless flat strap is coupled to a joint of pump iron on either side of the swing joint. If there is a change in elevation, an endless flat strap is coupled to a joint of pump iron on either side of the change in elevation that occurs at the swing joint. Additional endless flat straps may be used to secure the swing joint to the shackle. Additional endless flat straps may be coupled to other secure connection locations at the well site, such as the mud pump or well servicing or drilling rig or any suitable anchorage.

In operation, if there is a failure at one of the connection points in the pump iron system, the pump iron restraint system described herein will maintain the joints of pump iron within a reasonable distance of the axis of the wireline so that the pressure of the exiting gas and/or fluid will not cause the joints of pump iron to flail and injure persons or property. The placement of a taut wireline through a set of regularly spaced fastening systems causes the joints of pump iron to remain close to the line in the case of a failure. One advantage of the pump iron restraint system disclosed herein is that it can be easily and quickly assembled with a set of parts that are commonly found in the drilling and well servicing industry. The components, including the wireline, endless flat straps, screw pin shackles, screw pins, and snatch blocks are parts that may be available on a job site. One additional advantage of the pump iron restraint system is that it is unobtrusive and does not add additional complexity to the existing pump iron system. The pump iron restrain system disclosed herein has a small footprint and introduces relatively little in the way of additional parts into the surface area of the well site. Although the fastening system of this invention has been described with reference to an endless flat strap, it should be recognized that other strap configurations could be employed. Although the present disclosure has been described in detail, it should be understood that various changes, substitutions, and alterations can be made hereto without departing from the spirit and the scope of the invention as defined by the appended claims.

What is claimed is:

1. A pump iron system, comprising:
a first joint of pump iron having a first end and a second end;
a second joint of pump iron having a first end and a second end, wherein the first end of the first joint of pump iron is coupled to the second end of a joint of pump iron through a connector; and
a restraint system, comprising:
a first strap coupled to the first joint of pump iron;
a second flat strap coupled to the second joint of pump iron;
a screw pin shackle having an aperture at each of its ends;
a screw pin coupled to the screw pin shackle;
wherein the first strap and the second strap are coupled to the first joint and the second joint, respectively, to form an eye in each strap; and
wherein the eyes of the first strap and the second strap are placed around an interior arch of the screw pin shackle.

2. The pump iron system of claim 1, further comprising a wireline threaded through the opening formed by the screw pin shackle and the screw pin.

3. The pump iron system of claim 1, wherein the connector is a hammer union.

4. The pump iron system of claim 1, wherein the connector is a swing joint.

5. The pump iron system of claim 4, wherein the first joint of pump iron is at a different level of elevation as compared to the second joint of pump iron.

6. The pump iron system of claim 1,
wherein the first strap is coupled to the first joint of pump iron with a choker hitch knot; and
wherein the second strap is coupled to the second joint of pump iron with a choker hitch knot.

7. The pump iron system of claim 1,
further comprising a wireline threaded through the opening formed by the screw pin shackle and the screw pin;
wherein the first strap is coupled to the first joint of pump iron with a choker hitch knot; and
wherein the second strap is coupled to the second joint of pump iron with a choker hitch knot.

8. The pump iron system of claim 7, wherein the connector is a hammer union.

9. The pump iron system of claim 7, wherein the connector is a swing joint.

10. The pump iron system of claim 9, wherein the first joint of pump iron is at a different level of elevation as compared to the second joint of pump iron.

11. The pump iron system of claim 1, further comprising,
a snatch block; and
a wireline threaded through the snatch block.

12. A pump iron restraint system, comprising:
first and second straps;
a screw pin shackle having aperture at its ends;
a wireline;
a screw pin coupled to the screw pin shackle;
wherein the first strap is coupled to a first joint of pump iron and wherein the second strap is connected to a second joint of pump iron in a manner that forms an eye in the first strap and the second strap;
wherein the eye of the first strap and the eye of the second strap are placed around an interior arch of the screw pin shackle; and
wherein the wireline is threaded through the spaced formed by the screw pin shackle and the screw pin.

13. The pump iron restraint system of claim 12, wherein the connector is a hammer union.

14. The pump iron restraint system of claim 12, wherein the connector is a swing joint.

15. The pump iron restraint system of claim 12,
wherein the first strap is coupled to the first joint of pump iron with a choker hitch knot; and
wherein the second strap is coupled to the second joint of pump iron with a choker hitch knot.

16. The pump iron restraint system of claim 15, wherein the connector is one of a hammer union of a swing joint.

17. A method for restraining joints of pump iron, comprising:
coupling a first strap to a first joint of pump iron;
coupling a second strap to a second joint of pump iron, wherein the first joint of pump iron and the second joint of pump iron are coupled to each other through a connector;
providing a screw pin shackle; and
placing the first strap and the second strap around an interior arch of the screw pin shackle, inserting the running length of a wireline into the screw pin shackle and coupling a screw pin to the shackle.

18. The method for restraining joints of pump iron of claim 17, wherein the first strap and the second strap each have an eye at their ends and are placed around the interior arch of the screw pin shackle.

19. The method for restraining joints of pump iron of claim 18, wherein the screw pin shackle includes an aperture at each of its ends and wherein the screw pin is threaded through the apertures.

20. The method for restraining joints of pump iron of claim 17, wherein the connector is a hammer union.

21. The method for restraining joints of pump iron of claim 17, wherein the connector is a swivel joint.

* * * * *

UNITED STATES PATENT AND TRADEMARK OFFICE
CERTIFICATE OF CORRECTION

PATENT NO. : 8,132,595 B2
APPLICATION NO. : 12/424289
DATED : March 13, 2012
INVENTOR(S) : Gilbert Anthony Gayaut It is certified that error appears in the above-identified patent and that said Letters Patent is hereby corrected as shown below:

In claim 1, column 4, please replace the term "second end of a joint" with "second end of the second joint".

In claim 16, column 5, please replace the term "hammer union of a swing joint" with "hammer union or a swing joint".

Signed and Sealed this
Twelfth Day of June, 2012

David J. Kappos
*Director of the United States Patent and Trademark Office*

UNITED STATES PATENT AND TRADEMARK OFFICE
CERTIFICATE OF CORRECTION

PATENT NO.       : 8,132,595 B2
APPLICATION NO.  : 12/424289
DATED            : March 13, 2012
INVENTOR(S)      : Gilbert Anthony Gayaut It is certified that error appears in the above-identified patent and that said Letters Patent is hereby corrected as shown below:

Column 4, line 3 (Claim 1, line 6) please replace the term "second end of a joint" with "second end of the second joint".

Column 5, line 7 (Claim 16, line 2) please replace the term "hammer union of a swing joint" with "hammer union or a swing joint".

This certificate supersedes the Certificate of Correction issued June 12, 2012.

Signed and Sealed this
Third Day of July, 2012

David J. Kappos
*Director of the United States Patent and Trademark Office*